ively as the stone passes to their level.

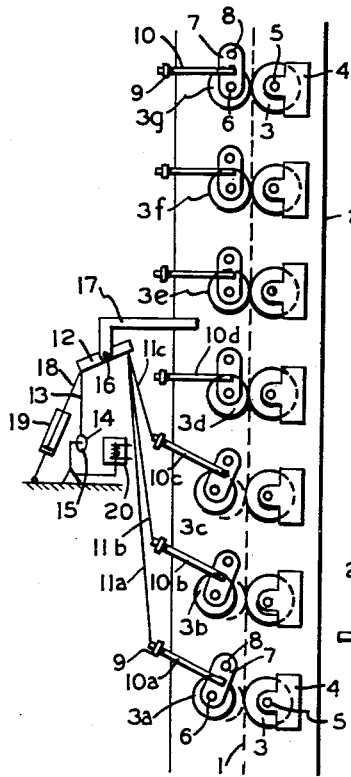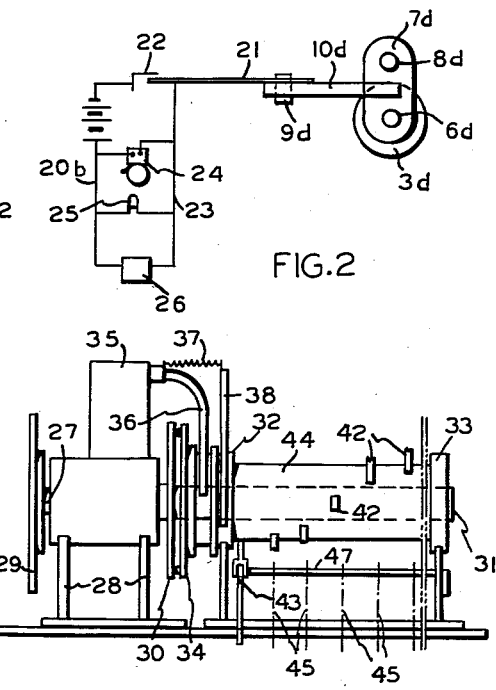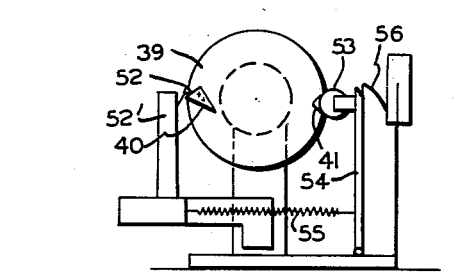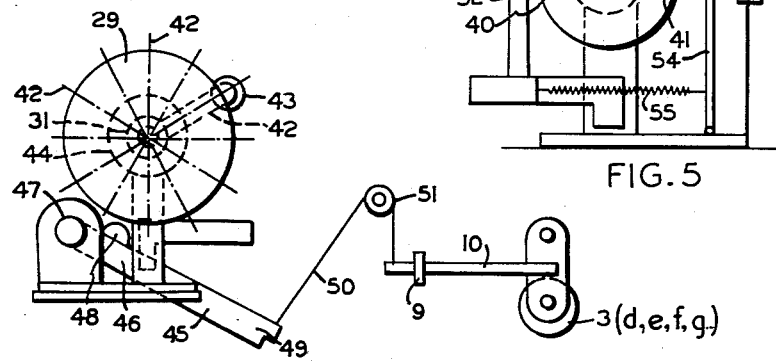

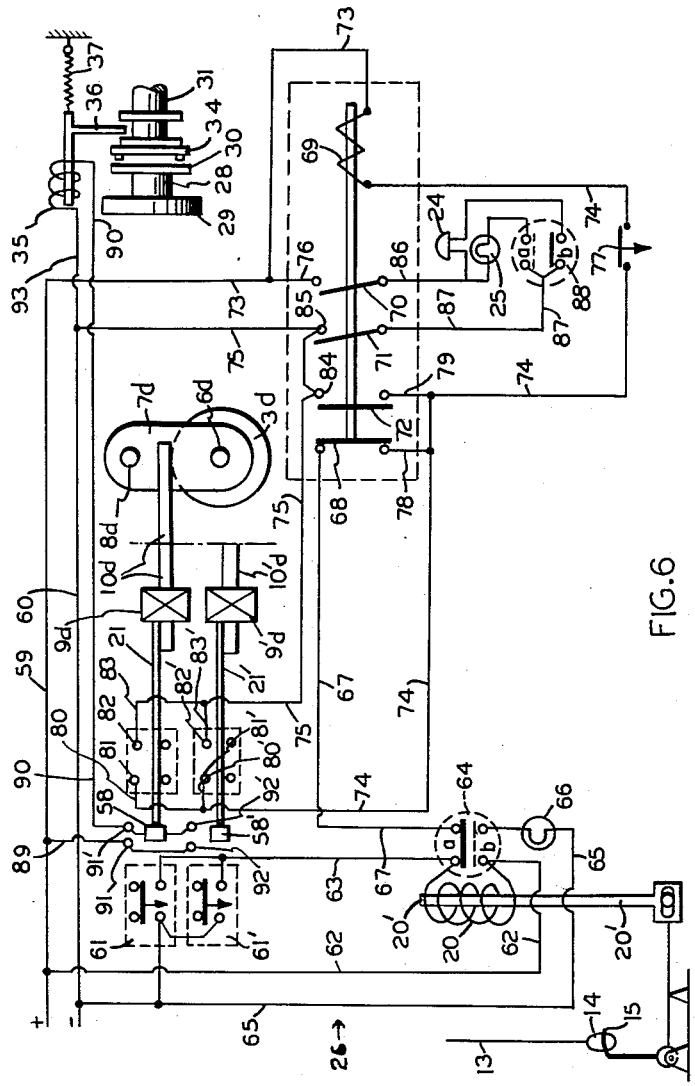

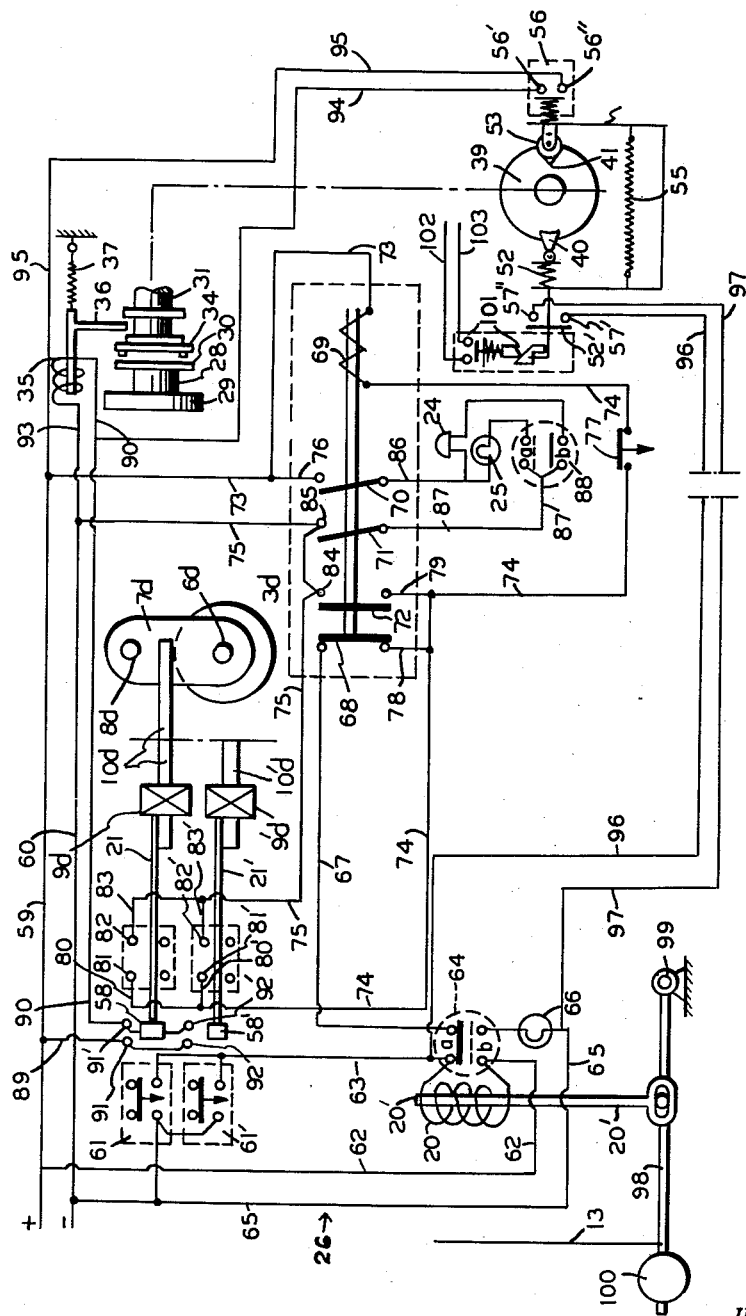

United States Patent Office 2,972,210
Patented Feb. 21, 1961

2,972,210

METHOD AND APPARATUS FOR DRAWING GLASS RIBBON MATERIAL

Arthur Broman, Lodelinsart, Michel Lambert, Charleroi, Pierre Gilard, Mont-sur-Marchienne, and Rene Van Herck, Zeebrugge, all in Belgium, assignors to Union des Verreries Mecaniques Belges Societe Anonyme, Charleroi, Belgium, a company of Belgium Filed Feb. 6, 1958, Ser. No. 713,625

Claims priority, application Belgium Feb. 14, 1957

12 Claims. (Cl. 49—17)

This invention relates to a method of and apparatus for preventing the accidental breakage of a ribbon of glass due to the presence of a stone during a drawing operation.

It is well known that drawn ribbon of glass sometimes contains protruding heterogeneities known as stones.

It is known also that a drawn ribbon of glass being annealed in a tower is drawn upwards by the action of drawing rollers, which are asbestos covered and arranged in pairs over the whole height of the drawing machine, each pair of drawing rollers comprising a stationary roller and a mobile roller.

The shafts of the mobile rollers are mounted in mobile bearings combined with counter weights by which these mobile rollers are lowered, i.e. brought towards the stationary rollers so as to ensure contact between the ribbon of glass and each pair of rollers and therefore the traction of the ribbon of glass by the rollers.

The result of this is that when a protruding stone passes between the two rollers of a pair of rollers, the pressure of the rollers is localised on the stone and this frequently causes the breakage of the ribbon, the result being a loss of production and various manufacturing breakdowns amounting sometimes to the stoppage of the drawing machine.

To avoid such accidents the operator supervising the machine must constantly inspect the ribbon of glass at the place where it is formed, to observe each stone which appears and relieve, i.e. remove, progressively the rollers of each pair of rollers in the drawing machine, as the stone passes under the pair of rollers in question.

It is obvious that some stones may escape the attention of the operator or even elude his vigilance if they are numerous.

It is therefore important to make the removal and lowering operations of the mobile rollers of the drawing machine automatic.

It is an object of the present invention to carry out automatically any one, several or all of the following operations, namely the detection of any stone which is present in the ribbon, the operation of a warning device which attracts the operator's attention as a result of this detection, the removal of the mobile rollers of the drawing machine as each stone passes, the lowering of the mobile rollers of the lower pairs of rollers, to hold the ribbon of glass while the mobile rollers of the other pairs are lifted, and the automatic return of the apparatus to the starting position thereof immediately after the passing of each stone.

According to the invention there is provided in the method of vertically drawing a ribbon of glass through an annealing tower, the steps of retracting progressively from the ribbon normally active mobile rollers and simultaneously activating normally idle mobile rollers in the lower part of the tower, whereby when a locality of the ribbon carrying a stone which modifies the thickness of the ribbon about the stone has passed the normally idle mobile rollers and is approaching the lowermost normally active mobile rollers, the latter rollers are prevented from applying pressure to the locality of the ribbon carrying the stone but sufficient tractive drive is maintained to the ribbon to assure its usual upward movement through the tower.

The invention also comprehends apparatus for vertically drawing a ribbon of glass through an annealing tower, characterised by normally idle mobile rollers grouped below normally active mobile rollers, each of the rollers co-operating with a stationary roller to form a pair between which the ribbon passes, and means operable to retract the normally active mobile rollers progressively to permit a stone lodged in the ribbon to pass thereunder free of pressure from the mobile rollers, and simultaneously to activate the normally idle mobile rollers to assure the normal upward movement of the ribbon through the tower.

The mobile roller or at least one lower pair of rollers is normally maintained in the raised position, and detection is carried out by the mobile roller of the first pair of rollers which are in contact with the glass. This will be, for example, the fourth pair of rollers counting from the bottom, it being understood that it could be another pair according to the working conditions in each case under consideration.

To ensure that when a stone occurs, the mobile roller of the first pair of rollers which are in contact with the glass (normally contacting rollers regardless of relative amount of pressure applied to glass sheet, are considered active rollers), is first of all slightly raised as soon as the stone appears at this first pair of active rollers, there is provided means which cause the lifting of the first active roller so as to prevent it from pressing on the stone, the funtioning of a warning device e.g. an electric bell and/or a light signal, and also the funtioning of, for example, an electric device, which lowers the mobile rollers of the lower idle pairs of rollers so as to hold the ribbon of glass while the active mobile rollers arranged at a higher level are raised.

An electric device is also provided to operate actuating means which automatically raises a certain number of mobile rollers arranged at a higher level, progressively as the stone passes to their level.

In order that the invention may be clearly understood a preferred embodiment thereof will now be described by way of example with reference to the accompanying drawings, in which:

Figure 1 is a diagrammatic view of part of a drawing machine, comprising several lower pairs of rollers known as holding rollers, the normally idle mobile rollers of which are automatically lowered to the holding position and lifted by hand, and also several upper pairs of drawing rollers, the normally active mobile rollers of which are automatically raised and automatically lowered to the drawing position, Figure 2 is an explanatory diagram of a detail of Figure 1, Figures 3 and 4 respectively show diagrammatically a side and left end view of an electromechanical device for operating the mobile rollers, Figure 5 is a right end view of Figure 4 showing a modified driving device for said rollers, Figure 6 is a circuit diagram of a semi-manual control associated with the apparatus of Figures 3 and 4, and Figure 7 is a circuit diagram of an automatic control associated with the modified apparatus of Figure 5.

Referring to Figure 1 of the drawings, a ribbon of glass 1 formed in a continuous manner from a bath of molten glass (not shown) is raised in an annealing tower 2 of a drawing machine by superimposed pairs of asbestos clad conveying rollers, each of these pairs comprising a stationary roller 3, the shaft 5 of which is capable of rotating in bearings 4 fixed to the tower 2 and a mobile roller 3a, 3b, 3c, 3d, 3e, 3f or 3g whose shaft 6 can rotate in a pair of plates 7 which can, but need not necessarily, form one piece with each other and which can pivot around a shaft 8 also fixed to the tower. Counterweights 9 mounted on levers 10 fixed to each of the plates 7 ensure the lowering of the mobile rollers 3a, 3b, 3c, 3d, 3e, 3f, 3g, and therefore the application to and pressing of the ribbon of glass 1 by each of the mobile rollers 3a, 3b, 3c, 3d, 3e, 3f, 3g, against its corresponding stationary roller 3.

According to the example shown each of the three lower normally idle mobile rollers 3a, 3b, 3c, can be kept during normal working in a position raised from the ribbon of glass by means of chains 11a, 11b, 11c, fixed respectively to the free ends of associated levers 10a, 10b, 10c, and to one of the arms of a two armed lever 12 which is able to swing around an axis 16 forming one piece with a support 17 fixed to the tower 2. The other arm of the lever 12 is attached to a chain 13 whose free end terminates, in the example under consideration, in a ring 14 held by a hook 15 which can be unhooked from the ring 14 by any appropriate control constituted in the example under consideration by an electro-magnetic control 20 described below.

The arm of the lever 12 to which the chain 13 is attached has a chain 18 attached thereto and to a dashpot 19 which, when the ring 14 is freed by the hook 15, prevents the lever 12 from suddenly see-sawing and thus damps the movement of the rollers 3a, 3b, 3c, towards the ribbon of glass, to avoid any impact which might damage the ribbon.

A separate identical holding device is provided at each of the two ends of each roller 3a, 3b, 3c, so that flexure of these rollers cannot prevent the functioning of the device.

The lowermost normally active mobile roller 3d acts as a detecting roller to sense a modification of thickness of the ribbon 1, and can be identical with the other mobile rollers or can be an extra, light sensing roller. Levers 10d, Fig. 2, are connected to the mobile roller 3d and are each equipped with a long contact rod 21 which co-operates with an electric contact 22 so as to switch on and off an electric circuit 23 comprising a bell 24, a signal lamp 25 and a plurality of devices generally designated in Figure 2 by the reference numeral 26, and described in detail below with reference to Figure 6. The devices 26 include the electro-magnetic control 20 which ensures the automatic lowering of the mobile idle rollers 3a, 3b, 3c according to Figs. 3, 4 and 6, or the automatic lowering and raising of the same rollers in accordance with the modification of Figs. 5 and 7 (described below) owing to the length of the contact rods 21, the movements of their extremities co-operating with the contacts 22 are amplified so as to close the circuit 23 at the beginning of the retraction of the roller 3d as a result of the passing of a stone in the ribbon of glass to the level of the roller 3d.

It will be apparent from the preceding description that the pairs of holding rollers 3a, 3; 3b, 3; 3c, 3 only hold and raise the ribbon of glass 1 during the passing of a stone between the pairs of drawing rollers 3d, 3; 3e, 3; 3f, 3; 3g, 3; that is during the raising of the normally active mobile rollers 3d, 3e, 3f, 3g.

Now, as it is not possible, after a stone has passed beneath the detecting roller 3d to raise all the normally active mobile rollers 3e, 3f, 3g simultaneously, and to leave the weight of the ribbon of glass supported only by the lower pairs of rollers 3a, 3; 3b, 3; 3c, 3; the normally active mobile rollers 3d, 3e, 3f and 3g must be raised successively.

Figures 3 and 4 show diagrammatically a device according to the invention for the successive raising of the normally active mobile rollers 3d, 3e, 3f and 3g.

On a shaft 27 which rotates in the bearing 28 are fixed a disc 29 driven by a speed reducer, not shown, which is driven by the motor shaft of the drawing machine, not shown, so that the speed of the shaft 27 is always in the same relation to that of the drawing machine. A clutch plate 30 is also fixed to the shaft 27.

On a second shaft 31 which rotates in bearings 32, 33 and is arranged in axial prolongation of shaft 27, there is mounted a clutch plate 34 in such a manner as to be rotatable with said shaft and slidable on it in the longitudinal direction. The axial displacement of the clutch plate 34 on the shaft 31 is effected by an electromagnetic device 35 by means of a fork 36 which is kept normally in the decoupling position by a spring 37 attached to a fixed holding device 38.

The part of the shaft 31 situated between the bearings 32 and 33 carries a series of radial arms 42 each carrying at its outer end a roller or travelling wheel 43. These arms may be individually arranged in any desired position on and around the shaft 31, for example by the means of a drum 44, in such a manner that any desired value may be given to the angular distance between any two of the arms 42.

The adjoining arms 42 are displaced in relation to each other by an angle corresponding to the distance between two consecutive normally active mobile rollers 3d, 3e, 3f, 3g, in such a way that when a travelling wheel 43 is in a predetermined position, the following travelling wheel arrives in the same position when the ribbon of glass has moved through a distance corresponding to the distance which separates two of the pairs of drawing rollers.

The radial arms 42 co-operate with the same number of levers 45 which can pivot at their ends 46 around a fixed horizontal axis 47 and are each equipped with a boss 48 co-operating with the travelling wheel 43 of the corresponding arm 42.

The free end 49 of each lever 45 is attached by a cable 50 passing over one or more stationary guiding pulleys 51 at the free end of the arms 10 of one of the mobile rollers 3d, 3e, 3f, 3g.

In the modification of Figure 5, the structure is identical to Figure 3 (and 4) but with an additional plate 39 (and associated elements) fixed to the righthand end of shaft 31, the plate being provided with a cam 40 and notch 41. The cam 40 of the plate 39 co-operates with a spring switch 52, 52' and possibly with an auxiliary contact 101, Figure 7, whilst the notch 41 of the plate 39 co-operates with a travelling wheel 53 mounted on a pivoting support 54, this latter being moved by a spring 55 with the travelling wheel 53 towards the plate 39 and co-operating with a spring switch 56.

In the electric circuit diagram of Figure 6 (controls apparatus of Figs. 1, 3 and 4) there is shown the detector roller 3d, with its elongated contact rods 21, 21' (the roller having a contact rod at each end so as to sense stones throughout the width of the glass sheet), the electro-magnetic control 20, 20' of the hook 15 co-operating with the ring 14 of the chain 13 by means of which the lowering of the holding rollers 3a, 3b, 3c, is carried out, the alarm bell 24 and the signal lamp 25, and the electromagnetic control 35, 36 of the clutch device 30, 34 on the shaft 31 that carries the arms 42 of Figure 3. Supplementary contact bodies 58, 58' are mounted on contact rods 21, 21', and these contact bodies 58, 58' being insulated from the rods 21, 21' serve to close the circuit of the electro-magnetic control 35, 36 of the clutch device 30, 34.

Line wires 59, 60 are connected to strip contacts 61, 61' mounted one on the right side and one on the left side of the tower 2 of the drawing machine (to conform with the respective double contacts 58, 58' and separate holding devices at the two ends of each roller), in the circuit 62, 63 of the electro-magnetic control 20, 20'. A two-way switch 64 co-operates with the short circuiting circuit 62, 65 of the electromagnet 20, which circuit can contain a signal lamp 66, and with connection wires 63 and 67, the last of which ends at an auxiliary contact 68 of an electro-magnetic relay 69 with principal contacts 70, 71 and a holding contact 72. The relay 69 comprises connection wires 73, 74, 75, the connection wire 73 possessing the tapping 76 co-operating with the contact 70, the connection wire 74 carrying a stop button 77 (which is normally closed), the tappings 78, 79 co-operating respectively with the auxiliary contact 68 and with the holding contact 72 of the relay, the tappings 80, 80' linked to the pairs of contact terminals 81, 81', left and right, for each of the arms 10d, 10d', 10e, 10e', 10f, 10f', 10g, 10g', of the rollers 3d, 3e, 3f, 3g, these arms co-operating also with the contact terminals 82, 82' linked to the tappings 83, 83' of the connection wire 75 which is also provided with the terminal tappings 84, 85 co-operating respectively with the holding contacts 72 and with the contacts 71 of the relay. Thus when roller 3d is raised, arm 21 bridges contacts 81 and 82 (21' bridges 81' and 82'). Connection wires 86, 87 are connected respectively to the contacts 70, and 71 of the relay and respectively by means of the bell 24 and the red lamp 25, mounted in parallel, to one side of a two way switch 88 and to the other side of the switch. Connection wires 89, 90 are connected respectively to the terminals 91, 91' and 92, 92' co-operating with the auxiliary contacts 58, 58' of the contact rods 21, 21' and respectively with the line wire 59 and with one of the terminals of the electro-magnet 35, whose other terminal is linked by the tapping 93 to the line wire 60. Figure 7 (controls modification of Fig. 5) is the same as Figure 6 except that elements 98, 99 and 100 are substituted for 14 and 15 which permits automatic raising of the normally idle mobile rollers through the operation of plate 39 cooperating with spring switches 52 and 56. Lever 98 is articulated to a fixed point 99 at one end while the other end carries an adjustable counterweight 100 with chain 13 attached near the counterweight end and the electro-magnetic controls 20, 20' secured near the middle so that closing the electro-magnet circuit will raise lever 98 (and chain 13) but the counterweight will lower the lever when the circuit is open. Connection wires 94, 95 connect respectively the terminals 56', 56'' of switch 56 to the connection wire 90 and to the line wire 59. Connection wires 96, 97, connect respectively the terminals 57', 57'' of the spring switch 52, 52' to the connection wires 63 and 65 of the electro-magnet 20, 20'.

When operating with Figure 6 controls, the operator must retract the normally idle mobile rollers by hand, i.e., pulls on chain 13 whereas with Figure 7 controls even the normally idle mobile rollers are retracted by the counterweight 100.

The functioning of the device described above is as follows:

First case: when a breakage occurs in the ribbon of glass for any reason.

We will suppose that the electro-magnet 20, 20' co-operates with the chain 13 by means of the ring device 14 with its hook 15 according to Fig. 6.

In normal working the switch 64 must always be in the position a which is the working position for the electro-magnet 20, 20'.

When the breakage takes place the operator operates the strip contacts 61, 61', the electro-magnet 20, 20' functions through circuit 59, 62, 20, 63, 61, 61', 60, the hook 15 releases the ring 14, and the rollers 3a, 3b, 3c, are activated and press the lower part of the ribon of glass 1 against the respective stationary rollers 3. At the same time the relay 68 to 72 functions through circuit 59, 73, 69, 74, 77, 74, 78, 68, 67, 64a, 63, 61, 61', 60 and then 59, 73, 69, 74, 77, 74, 79, 72, 84, 75, 60, as well as the bell 24 through circuit 59, 73, 76, 70, 86, 24, 88b, 87, 71, 85, 75, 60 and the relay 68 to 72 can only be reset by pressing the stopping button 77.

To bring the normally idle mobile rollers 3a, 3b, 3c, into the retracted position the operator must pull on the chain 13 and re-hook the ring 14 to the hook 15.

Second case: the operator sees a small stone, or a stone which is not dangerous, and does not wish to activate the normally idle mobile rollers 3a, 3b, 3c.

The switch 64 being in position a, the operator puts it into position b, which will keep the electro-magnet 20, 20' out of service when the detecting roller 3d, also known as stone forecaster, functions. It is, however, obvious that even in this case the normally idle rollers 3a, 3b, 3c, could be activated in case of danger, by inversion of the position of the switch 64 from b to a and by operating the contacts 61, 61'.

To allow the stone to pass the detecting roller 3d the operator raises this roller and accordingly the rod 21 and/or 21', according to the position of the stone, closes the contacts 81, 82 or 81', 82' which brings into action the relay 68 to 72 through the circuit 59, 73, 69, 74, 77, 74, 80 or 80', 81 or 81', 21 or 21', 82 or 82', 83 or 83', 75, 60. It must be noted that the two way switch 88 is at this moment in the position b which ensures the functioning of the bell 24.

The relay 68 to 72 is maintained in the closed position by the holding contact 72 which, by the closing of the circuit 59, 73, 69, 74, 77, 74, 79, 72, 84, 75, 60, short circuits the contacts 81, 21, 82 and 81', 21', 82'.

Once the stone has passed, the operator pushes the stopping button 77 in order to cut off the current passing through the coil 69 and thus resets the relay 68 to 72.

In the special case when the thickness of the glass ribbon increases before the contacts 81, 21, 82 and/or 81', 21', 82' have re-opened, or in certain cases of particular accidents in which the ribbon is deformed, obliging the operators to intervene to save the situation, the bell 24 will function without stopping. To avoid this disadvantage the operator puts the switch 88 into position a, thus opening the circuit of the bell 24 and closing at the same time that of the red lamp 25 which lights up and shows that the sound warning is cut off. The fact that the relay 68 to 72 thus remains energised has no disadvantage.

Third case: The operator sees a large stone, lowers the rollers 3a, 3b, 3c, and passes the stone under the rollers 3d, 3e, 3f, 3g.

For this purpose the operator puts into action contact 61, 61' thus causing the electro-magnet 20, 20' and the holding system 13, 14, 15 of the normally idle mobile rollers 3a, 3b, 3c, to function. He must choose the moment to intervene in such a way that the lifting of the rollers is synchronised with the passing of the stone. To stop the bell 24 he must put the switch 88 in position a. In both the second and third cases, the raising of detecting roller 3d initiates the operation of the automatic mechanism for raising the rollers 3e, 3f and 3g.

Fourth case: The operator has seen nothing and a stone is detected by the detecting roller 3d.

We will suppose that the electro-magnet 20, 20' operates the system 13, 98, 99, 100 shown in Figure 7, the chain 13 being attached to one end of lever 12 (Fig. 1), the other end of this lever being attached by chains 11a, 11b, 11c to levers 10a, 10b, and 10c of the respective mobile rollers 3a, 3b, 3c.

This is automatic functioning i.e. the normally idle mobile rollers 3a, 3b, 3c, occupy their raised position, Figure 1, and as soon as the stone reaches and begins to raise the detecting roller 3d, the contacts 21, 58 or 21', 58' close a first circuit 59, 62, 20, 64, 67, 68, 78, 74, 80, 81, 21, 82, 83 and/or 80', 81', 21', 82', 83', 75, 60 and a second circuit 59, 89, 91, 58, 91' or 59, 89, 92, 58', 92', 91', 90, 35, 93, 60. By reason of closing the first circuit the electromagnet 20 raises bar 20' which raises lever 98 which causes lowering and activation of the normally idle rollers 3a, 3b, 3c (When the first circuit is open, counterweight 100 lowers lever 98 and thus raises the idle rollers into holding position.); the functioning of the relay 68 to 72 and, therefore, that of the bell 24; and the coupling of the plates 30, 34 by the electro-magnet 35, 36 and the setting off of the system 39 to 51, Figures 5 and 7, which first causes by means of the distributing plate 39 with its notch 41 and cam 40, and the switches 52, 52' and 53, 56, the closing of the maintenance circuits 59, 95, 56", 56, 56', 94, 90, 35, 93, 69 and 59, 62, 20, 63, 96, 57', 52', 57", 97, 65, 69.

Then follows the complete raising of the detecting roller 3d, which thus affords free passage to the stone, the continuation of the rotation of system 39 to 51, Figure 5, after the return of the detecting roller 3d to the lowered position, the maintenance of rollers 3a, 3b, 3c, in the lowered position and the successive retraction and lowering of rollers 3e, 3f, 3g, at the moment when the stone passes thereunder.

When the distributing plate 39 completes one full revolution the cam 40 and the notch 41 resume their starting position corresponding to the opening of switches 52, 57 and 53, 56 and the circuits which are subject to them i.e. the circuit of the electro-magnet 20, 21', is cut out and the counterweight 100 returns the rollers 3a, 3b, 3c, by chain 13 to their raised position.

The circuit of the electro-magnet 35, 36 is cut out and by reason of this the plates 34, 30 are uncoupled from each other by the action of the spring 37. The relay 69 is then deactivated by opening contacts 77.

Moreover, as shown in Figure 7, the switch 52 can be combined with an auxiliary contact 101 controlling a circuit 102, 103 serving to put into action a device similar to that shown in the modification of Fig. 5, to govern the raising and lowering of the rollers i.e. 3h, 3i, etc., not shown, which are situated above rollers 3g, 3 if the height of the machine demands it.

It is obvious that the invention embraces numerous variants different from those described above and shown in the accompanying drawings. Thus for example the detector may be made up of any appropriate feeler, for example one or several very light sensing wheels or rollers independent or distinct from the rollers of the drawing machine and combined with these rollers separately or in groups. One or several series of such feelers which can be put into action separately or in groups can be arranged transversely to the ribbon of glass at one or several places and govern the raising and lowering of the normally active mobile rollers in any appropriate manner.

Amongst other things the object of the invention offers the advantage that because of its great sensitivity it sometimes functions when the operator has received a warning but detects no stone. On examining the sheet attentively he notices most frequently that a defect in the ribbon of glass operated the apparatus, excess thickness for example, which allows him to correct this defect which would have passed unnoticed in the absence of the detecting apparatus.

Moreover it is obvious that the detection of the stone, i.e. the slight raising movement of the detecting roller caused by the stone, could be operated by any other activating means apart from those described above, for example, a pneumatic, optical, or hydraulic control device.

We claim:

1. In the method of vertically drawing a ribbon of glass carrying a stone through an annealing tower, the steps of retracting progressively prior to passage of said stone normally active mobile rollers from said ribbon in the upper part of said tower, and simultaneously activating normally idle mobile rollers in the lower part of said tower, whereby said normally active mobile rollers are prevented from applying pressure to the locality of the ribbon carrying said stone but sufficient tractive drive is maintained on the ribbon to continue its usual upward movement through said tower.

2. A method as claimed in claim 1 additionally comprising the step of sensing said stone by an increase in thickness of said ribbon, and utilizing the movement of said ribbon to give an immediate indication of the presence of said stone.

3. A method as claimed in claim 2 wherein the lowermost normally active mobile roller is utilized to sense said stone.

4. A method as claimed in claim 3 wherein said lowermost normally active mobile roller initiates action of means operable to effect said progressive retraction of the normally active mobile rollers and activation of the normal idle mobile rollers.

5. In an apparatus for vertically drawing a ribbon of glass carrying a stone through an annealing tower including normally idle mobile rollers operatively mounted in the lower portion of said tower, normally active mobile rollers operatively mounted in the upper portion of said tower, and a stationary roller cooperatively mounted to form a pair with each said mobile roller between which said ribbon passes, the improvement of retracting means operable to progressively retract said normally active mobile rollers prior to passage of said stone sufficient to permit said stone to pass thereunder free of pressure and activating means to simultaneously activate said normally idle mobile rollers to assure normal upward movement of said ribbon through said tower.

6. In an apparatus for vertically drawing a ribbon of glass carrying a stone through an annealing tower including normally idle mobile rollers operatively mounted in the lower portion of said tower, normally active mobile rollers operatively mounted in the upper portion of said tower, a stationary roller cooperatively mounted to form a pair with each said mobile roller between which said ribbon passes, the improvement of detecting means operable to detect said stone, retracting means operable to progressively retract said normally active mobile rollers prior to passage of said stone sufficient to permit said stone to pass thereunder free of pressure, and activating means operable to simultaneously activate said normally idle mobile rollers to assure normal upward movement of said ribbon through said tower.

7. Apparatus as claimed in claim 6 wherein said means includes a detecting roller operatively mounted between said idle rollers and said active rollers to detect said stone by increased thickness of said ribbon, a warning device, and operative connections between said detecting roller and said warning device.

8. Apparatus as claimed in claim 7 wherein said means includes an electric circuit operatively connected between said detecting roller and said retracting and activating means.

9. Apparatus as claimed in claim 8 wherein said means includes a switch in said circuit that is closed by said detecting roller on detection of said stone to initiate said retracting and activating means.

10. Apparatus as claimed in claim 9 wherein said detecting roller is the lowest of said active rollers and said retracting means retracts said detecting roller as soon as said stone is detected.

11. Apparatus as claimed in claim 8 wherein said retracting and activating means includes an electro mechanical device in said electric circuit to move all said active and idle mobile rollers, and separate contacts activated by said detecting roller to control said electro mechanical device.

12. Apparatus as claimed in claim 6 wherein said means includes a detecting roller operatively mounted below at least one normally idle mobile roller to detect said stone by increased thickness of said ribbon.

References Cited in the file of this patent

UNITED STATES PATENTS

| | | |
|---|---|---|
| 1,514,385 | Hitchcock | Nov. 24, 1924 |
| 1,641,920 | Clark | Sept. 26, 1927 |
| 1,999,588 | Fox et al. | Apr. 30, 1935 |
| 2,300,522 | Redshaw | Nov. 3, 1942 |